Jan. 25, 1966  L. E. DE NEERGAARD  3,231,882
SIGNAL GENERATOR AND ELECTRICAL RESOLVER
Original Filed Nov. 30, 1954  3 Sheets-Sheet 1
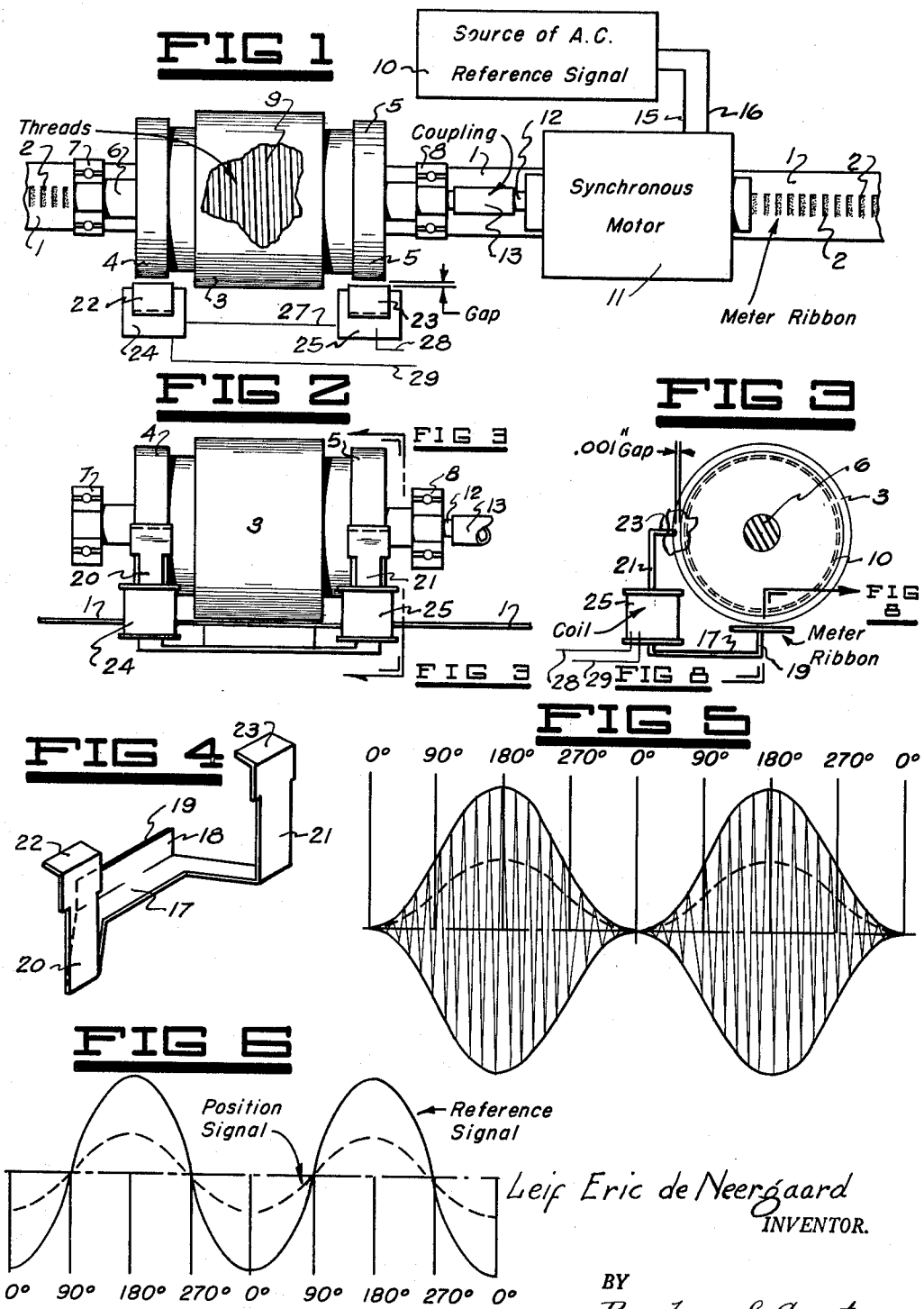

Jan. 25, 1966  L. E. DE NEERGAARD  3,231,882
SIGNAL GENERATOR AND ELECTRICAL RESOLVER
Original Filed Nov. 30, 1954  3 Sheets-Sheet 2
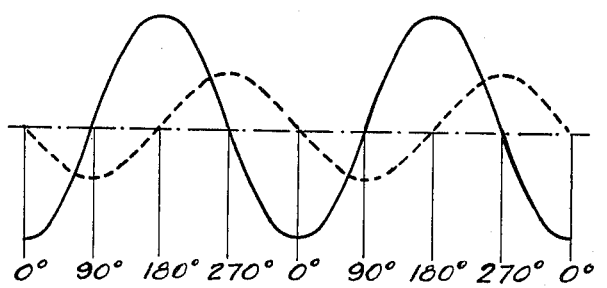
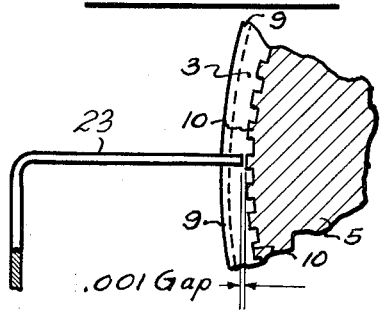
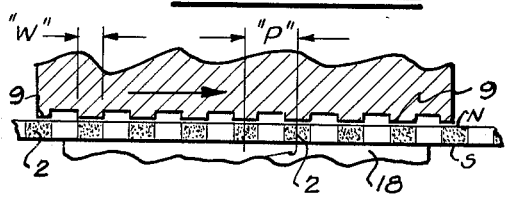
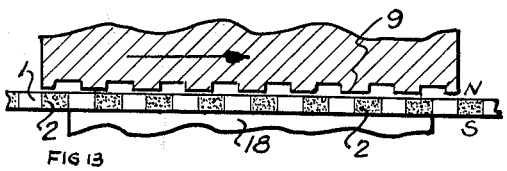
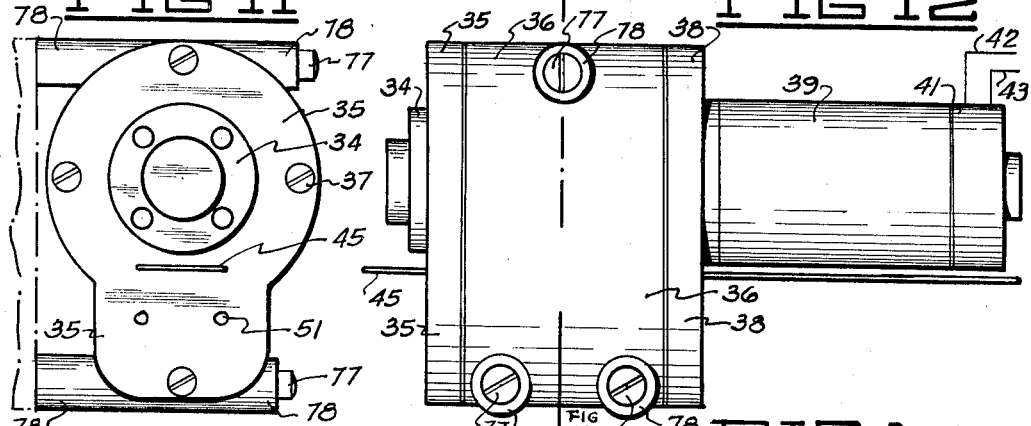
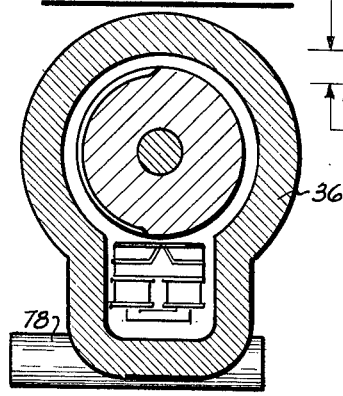
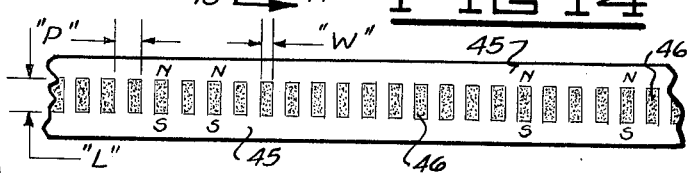
Leif Eric de Neergaard
INVENTOR.
BY
Parker & Carter
Attorneys Jan. 25, 1966  L. E. DE NEERGAARD  3,231,882
SIGNAL GENERATOR AND ELECTRICAL RESOLVER
Original Filed Nov. 30, 1954  3 Sheets-Sheet 3

Leif Eric de Neergaard
INVENTOR.

BY
Parker & Carter
Attorneys

United States Patent Office 3,231,882
Patented Jan. 25, 1966

3,231,882
SIGNAL GENERATOR AND ELECTRICAL RESOLVER
Leif Eric de Neergaard, deceased, late of Chicago, Ill., by The Northern Trust Company, executor, Chicago, Ill., assignor to Hans W. Trechsel, Madison, Wis., Deryck A. Gerard, Minneapolis, Minn., and Norman S. Parker, Evanston, Ill., trustees
Continuation of application Ser. No. 474,562, Nov. 30, 1954. This application July 25, 1960, Ser. No. 45,243
12 Claims. (Cl. 340—345)

The present invention is directed to a new and improved signal generator for translating the longitudinal movement of one element relative to another into a phase displacement of a cyclic signal which is exactly proportional to the movement. This application is a continuation of the copending application, Serial Number 474,562, filed November 30, 1954, now abandoned.

Although the device has many other uses, it can be very advantageously used to instantly and continuously detect and convert any displacement of a machine tool element, such as carriages, slides, spindles, platens and the like, into electrical phase displacements which are precise indices from instant to instant of the relative displacement of the element relative to its supporting structure. Such phase-shifting signal generators are of great value in so-called servo systems where the rate, direction and magnitude of displacement of one or more slideable work members of machine or fabricating tools are automatically controlled by displacement data storage members, such as cams or recorded tapes or films.

A major object of the present invention is the provision of a phase-shifting type of alternating current signal generator in which there is no physical contact between the generating elements thereof.

Another object is to provide a signal generator of the aforementioned type in which one of the generating elements of the generator has extremely small inertia.

Another object is the provision of an extremely efficient electrical resolver for resolving the motion of a movable member into a phase displacement of a cyclic signal.

Another object is the provision of an improved form of magnetic storage member which is used as one element of a signal generator and which can be manufactured at very low cost, yet with great accuracy.

Another object is the provision of an improved signal generator for translating movement of a machine element relative to another machine element into a phase displacement of a cyclic signal, which is an exact index of the relative displacement of the members.

Another object is the provision of an improved signal generator which is effective to generate a cyclic signal regardless of whether a machine tool element, such as a carriage of a lathe is stationary or moving with respect to another element, such as the bed of the lathe.

Yet another object is the provision of a cyclic signal generator in which the use of gears, slip rings, brushes, and similar wearing parts, are eliminated, thus materially enhancing the life of the generating assembly, as well as increasing the accuracy of the generator and reducing maintenance to a minimum.

Other objects will appear from time to time in the course of the specification and claims which follow.

Referring generally now to the drawings:

FIGURE 1 is a plan view of one species of signal generator uitilized in the invention;

FIGURE 2 is an elevational view of a portion of the generator shown in FIGURE 1;

FIGURE 3 is a sectional view of the portion of the generator shown in FIGURE 2 looking in the direction of the arrows shown in FIGURE 2;

FIGURE 4 is a perspective view of one magnetic element used in the generator shown in FIGURES 1, 2 and 3;

Figure 15:
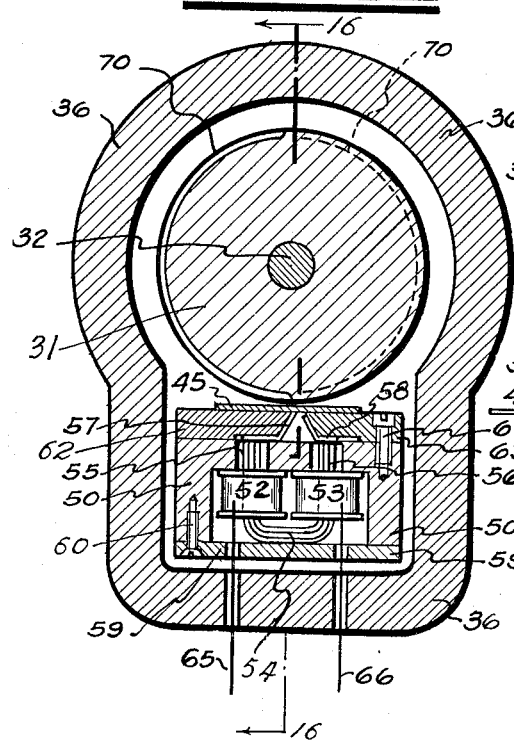
Figure 16:
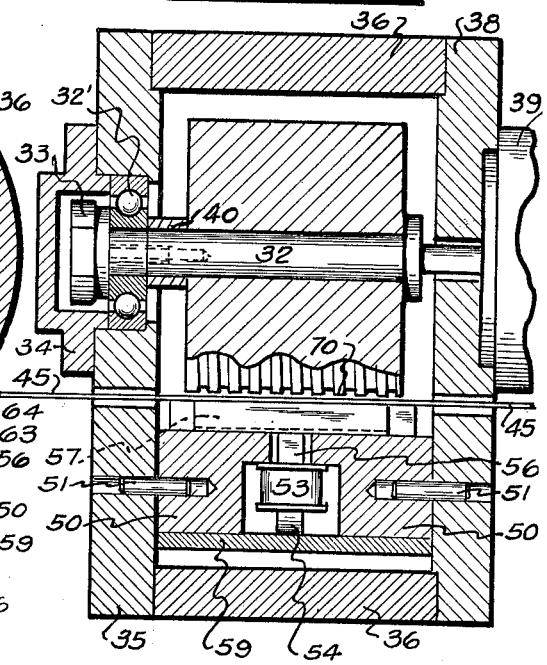
Figure 17:
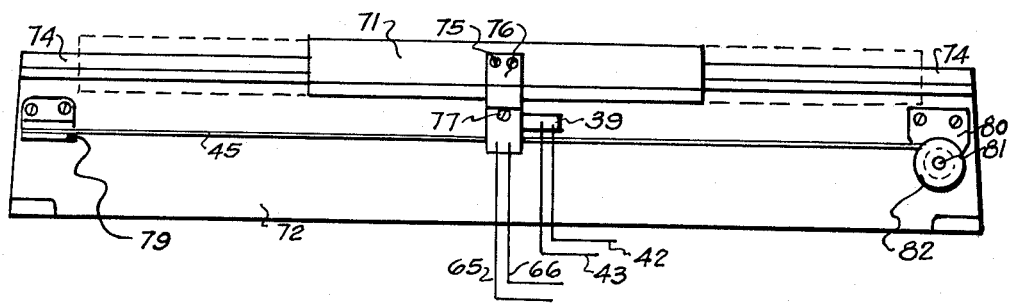

FIGURE 5 graphically depicts the signal output of the generator shown in FIGURES 1 through 4, inclusive;

FIGURE 6 is a graphic illustration of one cyclic signal generated from the assembly illustrated in FIGURES 1 through 5 as compared with another cyclic signal;

FIGURE 7 is a graphic illustration similar to FIGURE 6 but illustrating another phase relation of the signals illustrated in FIGURE 6;

FIGURE 8 is an enlarged detail view of a portion of the generator illustrated in FIGURE 3;

FIGURE 9 is a sectional view of the generating assembly shown in FIGURE 3 and taken along the section lines 8—8 of FIGURE 3 and illustrating a certain relationship between two generating elements used in the signal generator;

FIGURE 10 is a view similar to FIGURE 9 but illustrating another relationship of the elements therein shown;

FIGURE 11 is an end view of another embodiment of my invention;

FIGURE 12 is a front elevation of the embodiment shown in FIGURE 11;

FIGURE 13 is a sectional illustration of the embodiment shown in FIGURE 12 and taken along the section lines 13—13 of FIGURE 12;

FIGURE 14 is a plan view of one magnetic storage member or meter ribbon utilized in my invention;

FIGURE 15 is a sectional view similar to FIGURE 13 but enlarged to illustrate certain elements utilized in the assembly and their relationship to one another;

FIGURE 16 is a sectional view of the device as illustrated in FIGURE 15 when taken along the section line 16—16 of FIGURE 15; and FIGURE 17 illustrates the use of the invention in conjunction with a slideable work member of a machine or fabricating tool.

Like characters designate like elements throughout the specification and claims.

FIGURE 1 is a plan view of one species of signal generator. A meter ribbon 1 serves as a source of energy storage for the device. The meter ribbon is made preferably of special stainless steel having high magnetic retentivity. The thickness of this member, for purposes of description, can be taken to be .002", its width 1.000", while its length is dictated by the magnitude of the movement of a machine tool member (a lathe carriage for example) relative to another machine member (such as the supporting bed upon which the carriage slides).

A series of equidistantly spaced area is magnetically impressed along the length of the meter ribbon 1 to form bauds 2. These bauds are recorded through the thickness of the meter ribbon in such a manner that their north poles are on the upper surface of the meter ribbon and their south poles are on its lower surface, as shown in FIGURES 9 and 10. The pitch of these bauds measured along the longitudinal axis of the meter ribbon will be taken, for purposes of description, to be exactly .100", while their identical widths will be assumed to be one half the pitch, or .050".

A scanner 3 substantially cylindrical in form is rotatably mounted above the meter ribbon. The scanner is made from a piece of "Mumetal" or similar material having high permeability to low magnetic flux densities. The center body 3 of the scanner is slightly larger in diameter than the two similar integral disks 4 and 5, which are concentric to the axis of the center body 3. The length of this center body will be assumed to be exactly 1.000" measured along its axis. The scanner is supported by a shaft 6 made of bronze, brass or similar nonmagnetic material. FIGURES 1 and 2 clearly illustrate that the shaft is mounted on suitable antifriction bearings 7 and 8.

Examination of FIGURE 1 shows that scanning threads 9 are formed on the circumference of body 3. These threads extend along the entire length of this element. The reason body 3 is illustrated in FIGURE 1 as being partially threaded is due to the fact that the voids between the scanning threads are filled with a dense plastic to preclude the adhesion of foreign particles such as iron dust to the threads 9. Thus in FIGURE 1 the plastic is partially broken away to show these scanning threads. FIGURES 9 and 10 depict these elements in cross section taken at 8—8 of FIGURE 3.

The pitch of the identical scanning threads 9 (FIGURES 1, 9 and 10) is identical to the pitch P of the bauds 2 impressed along the length of the meter ribbon 1 or .100", the width W of the identical crests of the scanning threads will be assumed to be one half this pitch or exactly .050", while their depth can be considered to be .020".

FIGURE 8 is a partially broken section of disk 5 taken at FIGURE 3 and is intended to show the proportion of teeth 10 formed about the circumferences of this member and the similar disk 4. For purposes of description it will be assumed that the diameters of disks 4 and 5 to be 1.136", the circumferential pitch of the teeth to be .030" and their number 120. Since the voids between the teeth are filled with plastic to preclude adhesion of foreign particles to these elements, the disks 4 and 5 are illustrated in FIGURES 1 and 2 as having unbroken peripheries.

FIGURE 1 illustrates a synchronous motor 11 whose rotor shaft 12 is fastened to shaft 6 through coupling 13 which can be a helically wound spring or a slightly flexible plastic or rubber tube pressed on the ends of shaft 6 and rotor shaft 12. The motor will be assumed to have two poles and to be energized during operation of the signal generator with 60-cycle alternating current from a source of A.C. reference signal 10, FIGURE 1, supplied by the conductors 15 and 16.

FIGURES 3 and 4 illustrate an armature 17 made of "Mumetal" or similar material having high permeability to low flux densities. Its thickness may be assumed to be .015". FIGURE 4 is a perspective view of this armature and clearly illustrates its general configuration. A section of the armature is bent upwardly to form a vertical lip 18 whose upper horizontal edge 19 bears at all times against the under surface of the meter ribbon 1, as shown in FIGURES 2 and 3. It will be assumed for purposes of description that the length of the horizontal edge 19 extending along the axis of the tape is exactly .800". The armature is provided with two vertically extending legs 20 and 21 whose upper ends are bent inwardly toward the circumferential faces of disks 4 and 5 to afford magnetic pickups 22 and 23. The armature is positioned so that a gap of .001" (as an example) is maintained between the ends of the pickup 22 and 23 and the crests of teeth 10 cut in disks 4 and 5. The armature may be positioned and held in the position illustrated in FIGURES 2 and 3 by any suitable supports carried by the supporting structure for the scanning element 3, and movable in unison therewith. Two similar induction coils 24 and 25, FIGURES 1, 2 and 3, consisting of many turns of fine insulated copper wire are wound about the vertical legs 20 and 21. The coils are connected by conductor 27, FIGURE 1, while their signal outputs are conducted by leads 28 and 29.

Upon the synchronous motor 11 being energized with 60-cycle A.C. the scanner 3 is rotated at 60 r.p.s. and in a direction to cause the threads 9 to continuously scan the bauds 2 spaced along the meter ribbon 1 in a direction from left to right (as viewed in FIGURES 1, 2, 9 and 10) at the rate of 60 times per second. Since the length of the threaded section of the scanner is, as stated, exactly 1.000" long and the pitch of the threads 9 is .100", it will be seen that substantially 10 bauds on the meter ribbon will be continuously scanned by the threads 9 at the rate of 60 times per second. However, since the length of the horizontal edge 19 extending along the longitudinal axis of the meter ribbon is only .800", it will be apparent that magnetic flux from only 8 bauds will be conducted through the armature 17.

The magnitude of the flux threading the magnetic circuit comprised of the meter ribbon, scanner and armature will vary from maximum to minimum in a sinusoidal manner as the scanning threads are advanced from a position of exact registry with the bauds 2 (as shown in FIGURE 9) to a position where the threads are in precise registry with the unmagnetized areas on the meter ribbon which separate the bauds. Since the scanner is rotated at 60 r.p.s., it will be seen that the bauds will be continuously scanned 60 times per second.

The flux threading the magnetic circuit is chopped or cut 120×60 or 7200 times per second by the 120 teeth arranged about the circumferences of the disks 4 and 5. The output of the inductive coils is therefore a 7200 c.p.s. signal modulated at 60 c.p.s. as graphically shown in FIGURE 5. The sinusoidally varying configuration shown in dotted outline represents the wave form of the signal after detection and amplification by orthodox electronic circuitry. This signal will hereafter be alluded to as the position signal.

The teeth provided on the disks are used to enhance the magnitude of the signal obtained by the scanning of the bauds by the scanning threads, as it is well known that the total flux threading a magnetic circuit is proportional to the rate of change of that flux. However, it will be understood that in many applications of the generator being described, the teeth may be eliminated. This is especially true if the scanner is rotated at high speeds, such as 600 times per second, for at such a velocity the rate of change of flux in the magnetic circuit of the generator would obviously be 600 times per second and high enough to produce a signal output from the induction coils 24 and 25 of considerable magnitude.

FIGURE 9 illustrates the position of the scanning threads at the instant they are in register with the bauds impressed along the meter ribbon length. It will be assumed that at this time the position signal is in exact phase with the reference signal as shown in FIGURE 6. FIGURE 10 is intended to show that the meter ribbon has been displaced exactly .025" in a direction from left to right from its position illustrated in FIGURE 9. FIGURE 7 shows the new phase relationship of the position signal relative to the reference signal. It will be noted from this figure that the position signal lags the reference signal by exactly 90 electrical degrees. The magnitude of the phase shift is apparent when it is remembered that .025" displacement of the meter ribbon is exactly one quarter of the .100" pitch between bauds. It is also obvious that the phase shift of the position signal along a time axis will be lagging (−) since the meter ribbon has been moved in the same direction as the threads displacement over the bauds.

Conversely a .025" movement of the meter ribbon from the position shown in FIGURE 9 in the opposite direction or from right to left, would cause the position signal to lead the reference signal by +90 electrical degrees.

From the above description it is obvious that the generator just described is capable of instantaneously and continuously sensing any displacement of the meter ribbon along its axis and translating it into a phase shift of a position signal relative to a reference signal. It will be equally obvious that the sign (+ or −) and magnitude of this phase shift are exact indices of the direction and magnitude of the meter ribbon displacement.

FIGURES 11 to 16 illustrate a second species of the instant invention utilizing a meter ribbon along whose axis certain spaced magnetic areas or bauds are impressed by so-called longitudinal recording. FIGURE 11 is an end elevation of the variable phase generator; FIGURE 12 is a side elevation of the unit while FIGURES 13, 15 and 16 are cross sections taken in vertical planes through certain parts of the device.

Starting with FIGURE 16, which is a cross section taken in a vertical plane substantially through the axis of the body of the generator: A rotor 31 made of Mumetal or similar material having high permeability to low flux densities is press-fitted on a shaft 32 made of bronze or similar nonmagnetic material. The left-hand end of the shaft, as viewed in this figure, is fitted into the inner race of an antifriction bearing 32' which is positioned relative to the rotor 31 by a sleeve 40. A screw 33 screwed into the left-hand end of the shaft effectively locks the inner race of the bearing and the rotor 31 to the shaft. The outer race of the bearing is clamped between an end cap 34 and end plate 35. The latter is secured to a main housing 36 by means of screws 37, as shown in FIGURE 11. The end cap 34 and plate 35, main housing 36, and sleeve 40 should all be made of such nonmagnetic material as aluminum or bronze. FIGURE 16 shows the shaft extending to the right of the figure into a motor housing 39. The rotor (not shown) of the motor is mounted integral to this shaft whose extreme right-hand end is rotatably supported by an antifriction bearing (not shown) mounted in a motor end plate 41, FIGURE 12.

The motor 39 has two poles and is synchronous. For purposes of description it will be assumed that the frequency of the alternating current impressed on the motor windings (not shown) to be 60-cycle and that this alternating current serves as a reference signal. Leads 42 and 43, FIGURE 12, conduct this signal to the motor windings.

A meter ribbon 45, preferably made of special stainless steel having very high magnetic retentivity, is used as the measuring and magnetic energy storage member of the generator now being described. For purposes of description it will be assumed that its thickness is .002", its width 1.000", while its length is proportional to the total longitudinal travel of the slideable machine tool member to which it is applied.

FIGURE 14 illustrates a broken section of this meter ribbon in plan. A series of magnetized areas or bauds 46 are equidistantly spaced along the longitudinal axis of the meter ribbon 45. It will be assumed for purposes of description the pitch P measured along the axis of the meter ribbon 45 is precisely .100", their width W is one half of the .100" pitch or exactly .050", while the length L of these bauds measured transverse to the meter ribbon axis is .300". Each of the bauds can be thought of as a permanent magnet .002" in thickness, .050" in width and .300" in length. It will be noted from FIGURE 14 all of the bauds are magnetically oriented in the same way, that is, with all the north poles of the magnets (or bauds) nearest the upper edge of the meter ribbon 45 (as viewed in FIGURE 14).

FIGURES 9 and 10 can be used to graphically illustrate certain elements essential to the operation of the generator now being described. It is only essential to consider that the axes of the bauds 46 are perpendicular to the plane of the sheet upon which these figures are illustrated.

A single start right-hand thread 70, FIGURES 15 and 16, is formed along the length of the rotor 31. The pitch of the thread is exactly equal to the .100" pitch of the bauds 46. The width of the crests of the threads will be taken to be precisely one half of the pitch or .050" while their depth will be assumed to be .030". The threads can take the square form illustrated in FIGURES 9 and 10 or can be of 30° V configuration, if desired.

The length of rotor 31 will be considered to be 10 thread pitches or 10×.100"=1.000" in length.

A coil support 50 (FIGURES 15 and 16) made of "Formica," plastic, porcelain or similar nonmetallic material is rigidly fastened to end plate 35 and motor supporting plate 38 by means of four brass dowel pins 51. A centrally located cavity is provided in the coil support to accommodate two induction coils 52 and 53 and part of a laminated structure 54 built up of several laminations of Mumetal or similar material. The thickness of the Mumetal stock may for purposes of description be taken to be .020" thick. Two holes which communicate with the cavity are drilled through the upper part of the coil support. The two upper legs 55 and 56 of the laminated structure 54 pass through these holes. The upper horizontal surfaces of the laminations of the upper legs bear against the under surfaces of two reading lips 57 and 58. A lower plate 59 made of bronze or other non-magnetic material is secured to the under surface of the coil support by means of screws 60. This plate presses against the lower part of the laminated structure to ensure a good magnetic contact between the ends of the upper legs of this structure and the two reading lips 57 and 58.

Two meter ribbon supporting plates 62 and 63 are rigidly fastened to the upper horizontal surface of the coil support 50 by means of screws 64, FIGURE 15. The supporting plates are made of bronze or similar non-magnetic material. Since their upper surfaces lightly support the meter ribbon, they may be ground and chrome plated, if desired, to reduce friction to a minimum. The meter ribbon supporting plates also serve to rigidly clamp the two reading lips to the coil support.

FIGURE 15 clearly shows the profile of the reading lips 57 and 58, which are made of Mumetal or comparable material. The thickness of the stock from which the reading lips are made can for purposes of description be taken to be .015". It will be noted that the adjacent portions of the two reading lips are bent upward. The included angle between the bent legs can be 60° as shown in FIGURE 15. The upper horizontal edge of reading lip 57 bears against the under surface of the meter ribbon 45. A gap in the neighborhood of .008" is provided between the upper horizontal edge of the reading lip 58 and the undersurface of the meter ribbon. A gap measured in the horizontal of .015" (as an example) is maintained between the upper edges of the two reading lips. As shown in FIGURE 15 this gap is not symmetrical with the vertical center line of the rotor 31. It has been found that optimum results can be obtained if the gap is some .030" to .050" off center in relation to that center line. Study of FIGURE 16 will show that the length of the reading lip 57 (shown in dotted outline) is less than the 1.000" length of rotor 31. For purposes of description it will be assumed that the length of the two reading lips is exactly equal to the pitch of 8 bauds, FIGURE 14, or 8×.100"=.800".

The two induction coils 52 and 53 are connected in series and are identical. Each consists of thousands of turns of fine insulated magnet wire. Coils 52 and 53 are positioned about the upper legs 55 and 56 respectively of the laminated structure 54. Two insulated wires 65 and 66 serve to conduct the pulsating E.M.F. signal output of the induction coils from the generator housing.

The meter ribbon 45, as will be later shown, is under a certain exact tension when the generator being described is applied to a machine tool. The meter ribbon is mounted in such a manner that it bears lightly upon the upper highly finished surfaces of the two meter ribbon supporting plates 62 and 63. The gap as viewed in FIGURE 15, between the upper edges of the reading lips are substantially bridged by the meter ribbon and therefore by the spaced bauds which as stated may be thought of as permanent magnets .002" thick, .050" in width and .300" in length. A fixed air gap of minimum length is provided at all times between the upper surface of the meter ribbon and the crests of the scanning threads 70, generated along the length of the rotor 31. This gap may, for purposes of description, be considered to be .002" in length.

Each baud consists of many infinitely, small, permanent magnets or series of permanent magnets which during recording of the meter ribbon are arranged with their axes transverse to the axis of the meter ribbon. The special stainless steel from which the meter ribbon is preferably made is of low permeability. Therefore, there is considerable flux leakage from the magnetized areas or bauds where the long paths of leakage flux may be considered parallel to the many series of infinitely small magnets making up the bauds. This leakage flux constitutes the working flux for the signal generator now being described.

It should at this point be stated as well known to those skilled in the art, that longitudinal recording of intelligence indicia such as the spaced bauds 46 on the meter ribbon 45 (where recording is accomplished by polarization longitudinally of and parallel to a surface or surfaces of the meter ribbon) is much more efficient than so-called transverse recording used in impressing the spaced bauds 2 on meter ribbon 1, FIGURE 1 of the signal generator just described and illustrated in the instant disclosure. Much sharper delineation of the spaced bauds can be obtained by longitudinally recording and it is possible by this technique to impress bauds along the axis of a meter ribbon which have a very high magnitude of flux compared to bauds impressed on such a member by transverse recording means.

In the following description of the operation of the device it will be apparent from study of FIGURE 16 that the meter ribbon lies in a horizontal plane and is movable from left to right or right to left through the generator housing. From this it will be understood that movement of this meter ribbon illustrated in FIGURE 15 will be normal to the plane of this figure or towards or away from the viewer.

The scanning threads above the meter ribbon illustrated in FIGURES 15 and 16 are parasitic members which absorb flux from the bauds as the threads continuously scan these magnetized areas. These scanning threads can therefore be thought of as the "nonworking" circuit of the system. The magnetic circuit under the meter ribbon comprised of the laminated structure 54, reading lips 57 and 58 and induction coils 52 and 53 comprise the working circuit of the generator as will now be shown.

As stated the lengths of the reading lips 57 and 58 as viewed in FIGURE 16 are exactly .800" long. Thus, at any time, the upper edges of these members will be substantially in contact with 8 bauds (it being remembered the pitch of the bauds is .100"). Viewed in FIGURE 15 a length of the longitudinal axes of these 8 bauds bridges the gap between the upper tips of the coacting reading lips. Assume that the south poles of the bauds (which as stated can be considered to be spaced permanent magnets .002" thick, .050" wide and .300" long) are to the left of this gap and that their north poles are to its right.

Since the reading lips are made of a material having very high permeability to low flux densities, flux from the 8 bauds will thread through the tip of reading lip 58 thence in a clockwise direction (as viewed in FIGURE 15) through the laminated structure 54 to the reading lip 57 and outward through its tip to the bauds. Obviously under this condition, no alternating or pulsating E.M.F. will be induced in the windings of the induction coils 52 and 53, since the flux passing through the coils will be at a steady state or of constant magnitude. However, when the windings of the motor 39 are energized with 60 cycle alternating current (which is also used as the reference signal) the rotor 31 will be rotated at a rate of 60 r.p.s. causing the scanning threads 70 (with proper polarity connections) to scan the spaced bauds extending along the axis of the meter ribbon at the rate of 60 times per second.

Since the rotor 31 and therefore the threads 70 are made of a material having very high permeability to low flux densities, a considerable amount of flux will be absorbed or "robbed" from the spaced bauds. The magnitude of this absorbed flux will be at a maximum at those instants the crests of the threads are in exact register with the bauds as shown in FIGURE 9. As the scanning threads advance from left to right (as shown in FIGURE 9) they are moved more and more out of register with the bauds until they are in precise coincidence with the unmagnetized areas on the meter ribbon separating the bauds. At these instants the scanning threads will absorb minimum flux from the bauds. Since as stated, the scanning threads are of single start configuration, it will be seen that the threads will be rotated through exactly 180° when they are displaced from the point of maximum flux absorption to the point of minimum absorption along the meter ribbon. Thus the flux absorbed by the scanning threads from the spaced bauds varies in a sinusoidal manner from maximum to minimum and back to maximum once per revolution of the rotor or 60 times per second.

Flux from the 8 spaced bauds magnetically coupled to the "working circuit" will flow through this circuit by varying amounts controlled by the amount of flux being absorbed from these bauds by the scanning threads or "nonworking circuit" from instant to instant. Thus, when maximum flux is absorbed by the "nonworking circuit" (when the crests of the threads are in exact register with the bauds) minimum flux will thread through the "working circuit," and maximum flux will flow through this circuit at those instants that the threads are exactly midway between the bauds.

The magnitude of flux from the bauds threading the "working circuit" under the meter ribbon is thus effectively modulated 60 times per second by the flux absorption of the scanning threads as they continuously scan these bauds. This cyclically varying magnetic flux threading the magnetic circuit of the "working circuit" causes a very powerful cyclically varying E.M.F. modulated at 60 c.p.s. to be inductively built up in the windings of the induction coils 52 and 53. The magnitude of this signal can be 100 or more millivolts depending on such variables as the number of scanning threads, materials from which the meter ribbon and parts of the magnetic circuits are made and the like. It will also be found that with proper construction the signal-to-noise rate of the signal output of this generator can be very high, on the order of 200:1 or even higher. In the actual application of this generator to a slideable member of a machine or fabricating tool, its signal output is used as an index of the position of that member. It may therefore, be alluded to as a "position signal." As stated, the 60 cycle alternating current impressed on the windings of the 2-pole synchronous motor is not only used to energize this motor but is also used as a reference signal from which any shift of the position signal along a time axis is measured.

It will be assumed that the crests of the scanning threads are in exact coincidence with the bauds as illustrated in FIGURE 9 and that the position signal is in precise phase with the reference signal as depicted in FIGURE 6. The above condition can be established by moving the meter ribbon along its axis to a certain position relative to the generator housing. As long as the meter ribbon is not moved from this position, the two signals will be in exact phase with one another.

Now let it be assumed that the meter ribbon is advanced from the above position in a direction from left to right (as viewed in FIGURE 16) by exactly .025". This new position is illustrated by FIGURE 10. It will be found that the position signal will be displaced in a lagging (−) direction by exactly 90 electrical degrees. This phase shift is due to the bauds being displaced to the right from their original position seen in FIGURE 9 by exactly one quarter of the .100″ pitch between bauds to the new position illustrated by FIGURE 10. It is obvious from this last figure that the scanning threads will have to be moved through 90 mechanical degrees before they will be again in exact register with the bauds. Since 90 mechanical degrees is one quarter of a revolution and the threads are rotated at 60 r.p.s. it will be seen that there will be a time lag of 1/240 of a second before the crests of the scanning threads are in register with the spaced bauds. This phase relationship of the position signal relative to the reference signal is graphically illustrated by FIGURE 7.

It will be apparent that a leading (+) phase displacement of exactly 90 electrical degrees of the position signal relative to the "reference signal" will result if the meter ribbon is advanced from its position shown in FIGURE 9 by a distance of .025″ in a right to left direction. Since displacement of the meter ribbon by one quarter of the .100″ pitch of the bauds and scanning threads or .025″ causes a phase shift of 90 electrical degrees, it is apparent that a longitudinal displacement of the meter ribbon of exactly 1 pitch or .100″ will produce a phase shift of precisely 360 electrical degrees while a displacement of the meter ribbon through a distance of .001″ will cause the position signal to be shifted by 3.60 electrical degrees in relation to the reference signal.

It will be understood that movement of the meter ribbon in the same direction that the threads continuously scan the bauds on the meter ribbon or from left to right as viewed in FIGURES 9, 10 and 16 causes a lagging or minus (−) phase displacement of the position signal relative to the reference signal while opposite displacement of the meter ribbon produces a leading or positive (+) shift of the position signal in relation to the reference signal.

FIGURE 17 depicts a slideable machine tool member whose longitudinal movement is being continuously sensed by the second species variable phase generator just described and illustrated in the instant disclosure. A carriage 71 adapted to support a slide to which a tool is fastened (as a lathe carriage) or adapted to support a workpiece (as a milling machine table) is slidably supported by a bed 72. Suitable gibs serve to hold the carriage in alignment with the slide 74 suitably prepared along the upper surface of the bed. A suitable dependent bracket 76 is fastened integral to the carriage by screws 75. The main housing 36 (see FIGURE 12) is securely fastened to the lower end of the bracket 75 by means of three screws 77 passing through three suitable lugs 78 integral to the main housing 36 of the generator. A meter ribbon 45 passes through the body of the generator. The left hand end of this meter ribbon is rigidly fastened to the end of the bed 72 by means of a clamping fixture 79 which is mounted integral to the extreme left hand end of the bed 72 as viewed in FIGURE 17. A pulley bracket 80 is mounted integral to the extreme right hand end of the bed 72. An outwardly extending stub shaft 81 integral to the pulley bracket serves to support a pulley 82. Although not shown it will be understood that high grade antifriction bearings are used in the pulley to reduce friction between this member and the stub shaft to a minimum. The right hand end of the meter ribbon 45 is supported by the pulley 82. A weight is securely fastened to the extreme right hand end of the meter ribbon to tension this member at all times by a certain preselected amount. The plane of the meter ribbon is horizontal and is maintained at all times exactly parallel to the slides 74 supporting the carriage 71. Conductors may extend from the housing of the generator to any suitable means for amplifying the signal generated and for delivering electrical energy to the motor for the scanners.

Due to the particular arrangement of the meter ribbon and scanner which has been described, there is no physical contact between the generating elements with the result that there is no wear on these elements. Furthermore, the signal is continuously generated whether the movable machine element is stationary or moving with respect to the remainder of the machine. Due to the scanning action in a direction parallel to the length of the meter ribbon, the phase and frequency of the generated signal is unaffected by relative movement of the meter ribbon and scanner in a direction transverse to the longitudinal axis of the meter ribbon.

Whereas allusion has been made to the scanners in the form of helical screws with their axes extending generally parallel to the longitudinal axis of the meter ribbon, other forms of scanners may, under certain circumstances, be employed. For example, under certain circumstances, a scanner may be formed by spacing a plurality of magnetic flux regulating elements along the meter ribbon with groups of three or four of the elements spaced apart in accordance with the spacing of the magnetic bauds on the ribbon. During such instants that the movable element of the machine tool is stationary, these portions of the scanner would be stationary with respect to the meter ribbon. These portions would, however, be movable coextensively with the movement of the machine tool element. Each of the portions or members in each group may be supplied with a cyclic signal having a frequency on the order of 60 cycles per second but the electrical impulses supplied to the several portions or members of an individual group would be out of phase with one another by a predetermined amount as for example, 120° if three portions are employed in each group, with the result that the magnetic flux emitted from the bauds would be shunted in a cyclic manner. The signal induced in the induction coils of the circuit would then be modulated at a predetermined frequency, namely, that frequency of the signal supplied to the members. Movement of the machine tool element relative to the machine then has the result of instantaneously varying the amplitude of the signal induced in the induction coils and a phase shift proportional to movement of the movable machine element is attained in the signal generated.

In each form of the invention, the bauds are scanned in a direction parallel to the longitudinal axis of the meter ribbon. In each form of the invention movement of the scanner in a direction parallel to the longitudinal axis of the meter ribbon produces the phase shift in the signal generated.

Whereas there have been described certain elements in the invention as having particular dimensions, it should be understood that these dimensions are not critical. They may be varied to suit individual requirements. It is important, however, that the bauds have a generally identical size and are equally spaced from one another along the longitudinal axis of the meter ribbon. It is also important that the scanning elements be movable bodily in a direction parallel to the length of the meter ribbon in response to movement of the movable machine tool element. It is also important that the scanning action takes place in a direction parallel to the length of the meter ribbon.

There are other modifications falling within the scope and spirit of the invention which will be obvious to those skilled in the art. For example, suitable spring means may be provided to maintain the meter ribbon in a generally horizontal plane in lieu of the weight that has been described. In view of the above, the scope of the invention should be limited to the scope of the hereinafter appended claims.

What is claimed is:

1. A signal generating assembly including an elongated magnetic storage member and a scanning assembly, said storage member being movable with relation to said scanning assembly, said storage member including areas of differential flux transmissive characteristics along the length thereof, said scanning assembly including means for traversing said areas at a predetermined rate relative to a base frequency to vary the flux pattern at a predetermined frequency when the storage member and scanning assembly are stationary, movement of said storage member with relation to said scanning assembly being effective to produce a phase change in the frequency of said flux pattern relative to the base frequency.

2. A signal generating assembly for machine tool elements and for translating movement of one element of a machine relative to another element into a corresponding phase displacement of a cyclic signal relative to a base frequency including, an elongated meter ribbon fixed with respect to one element of said machine and having a length corresponding generally to the range of movement of the other element of the machine, said meter ribbon having differential flux transmissive areas along the length thereof, and a flux modulator movable with said other element and movable independently of said other element to modulate flux at a predetermined frequency relative to the base frequency when said other element is stationary, and to produce a phase change in the flux cycle relative to the base frequency in response to movement of said other element relative to the said one element.

3. A phase shifting signal generator including an elongated magnetic storage member, said storage member having differential magnetic flux emissive areas equally spaced along the length thereof, alternate areas having similar magnetic characteristics and being spaced from one another a predetermined distance taken along the length of said storage member, means for scanning said areas at a predetermined scanning rate in a direction generally parallel to the length of said storage member to generate a cyclic signal when the storage member and scanning means are stationary relative to each other, said scanning means being movable relative to said storage member to vary the phase of said signal relative to the scanning rate.

4. A signal generator as set forth in claim 3 wherein said scanning means is movable relative to said storage member in a direction parallel to the longitudinal axis of said storage member.

5. A signal generator as set forth in claim 3 wherein said scanning means includes a plurality of movable magnetic flux regulating members opposed to a plurality of said flux emissive areas.

6. A signal generator as set forth in claim 3 wherein said scanning means includes a rotary flux regulating body having a plurality of portions spaced along the length of said storage member.

7. The structure of claim 3 further characterized by means for modulating said cyclic signal at a predetermined rate.

8. The structure of claim 7 further characterized in that said modulating means includes a rotary flux regulating body positioned to scan said storage member.

9. The structure of claim 3 further characterized in that said scanning means includes a rotary flux regulating body, and a means for modulating said cyclic signal including a further rotary flux regulating body positioned to scan said storage member in consonance with said first flux regulating body.

10. A method of translating movement of a machine element relative to another element into a phase displacement of a cyclic signal relative to a reference signal, including the steps of positioning a magnetic flux storage member and a flux modulator therefor for movement relative to one another, maintaining the modulator stationary relative to said storage member during such instances that said elements are stationary relative to one another while continuously varying the flux from said storage member with said modulator in a cyclic manner to develop a cyclic signal, and varying the phase of said cyclic signal relative to the reference signal by moving said modulator relative to said storage member in response to relative movement of said elements.

11. A phase shifting signal generator for use in translating movement of one element of a machine relative to another element into a corresponding phase displacement of a cyclic signal relative to a base frequency including a magnetic circuit having a source of flux, means for varying the flux in said circuit to produce a cyclic signal of a predetermined frequency when said elements are stationary, one to the other, relative movement of said elements being effective to produce a phase change in said cyclic signal relative to said base frequency.

12. The structure of claim 11 further characterized by means for modulating the flux in said magnetic circuit at a different predetermined frequency to produce modulation of said cyclic signal.

References Cited by the Examiner

UNITED STATES PATENTS

| | | | |
|---|---|---|---|
| 2,353,631 | 7/1944 | Bliss | 178—6.6 |
| 2,575,342 | 11/1951 | Gridley | 342—172.5 |
| 2,609,143 | 9/1952 | Stibitz | 340—174.1 |
| 2,628,539 | 2/1953 | De Neergaard | 174.1 |
| 3,127,592 | 3/1964 | De Neergaard | 340—174.1 |

NEIL C. READ, *Primary Examiner.*

IRVING L. SRAGOW, WILLIAM C. COOPER,
*Examiners.*